(12) United States Patent
Hutzenlaub et al.

(10) Patent No.: US 6,409,118 B1
(45) Date of Patent: Jun. 25, 2002

(54) CONTACT ROLLERS FOR A WINDING MACHINE

(75) Inventors: Armin Hutzenlaub; Dietmar Kunkel, both of Wiehl (DE)

(73) Assignee: Kampf GmbH & Co. Maschinenfabrik, Wiehl (DE)

( * ) Notice: Subject to any disclaimer, the term of this patent is extended or adjusted under 35 U.S.C. 154(b) by 0 days.

(21) Appl. No.: 09/807,758

(22) PCT Filed: Sep. 15, 1999

(86) PCT No.: PCT/EP99/06826
§ 371 (c)(1),
(2), (4) Date: Apr. 18, 2001

(87) PCT Pub. No.: WO00/23364
PCT Pub. Date: Apr. 27, 2000

(30) Foreign Application Priority Data

Oct. 21, 1998 (DE) .......................... 198 48 532

(51) Int. Cl.[7] .............................. B65H 18/26
(52) U.S. Cl. ..................................... 242/547
(58) Field of Search ............... 242/547, 541.5, 242/541.6, 542.4, 530.1, 530.3

(56) References Cited

U.S. PATENT DOCUMENTS 3,915,404 A * 10/1975 Kampf et al. ............... 242/547
6,182,919 B1 * 2/2001 Fisher et al. ................ 242/547

FOREIGN PATENT DOCUMENTS

DE         39 41 384 C1    6/1991
WO         WO 99/41174     8/1999

* cited by examiner

*Primary Examiner*—John M. Jillions
(74) *Attorney, Agent, or Firm*—Herbert Dubno; Andrew Wilford

(57) ABSTRACT

Contact roller systems comprising several hollow cylindrical roller segments (2) that are mounted next to each other on the front face side in such a way that they can rotate freely on a continuous shaft (1) are already known per se in winding machines. According to the invention, the internal bearing parts of a roller segment (2) terminate on at least one axial end at a distance (4) from the front face of the roller segment (2). A free space is thus formed, whereby parts of a support bearing (5) which supports the shaft (1) and/or parts of an adjusting lever (6) can be arranged therein. The support bearing (5) and/or the adjusting lever (6) have an annular groove (7) in which the end of the roller segment (2) can rotate in a contactless manner. It is possible to keep the gap between two adjacent roller segments (2) as small as possible in order to avoid markings, while still allowing the support bearing (5) and/or adjusting lever (6) to act.

6 Claims, 4 Drawing Sheets

CONTACT ROLLERS FOR A WINDING MACHINE

FIELD OF THE INVENTION

The invention relates to a winding-machine contact-roller system with a plurality of hollow cylindrical roller segments that are arranged end-to-end and freely rotatable on a throughgoing axle and a winding machine having the contact-roller system for winding up a continuously moving web, in particular a paper web or plastic foil.

STATE OF THE ART

Winding machines for winding up a running web, for example a paper web or plastic foil, use as is known contact rollers as pressure or squeeze rollers in order to largely prevent trapping of air in the winding roll at high winding speeds. If the winding machine is to wind up webs separated by longitudinal cuts onto respective winding rolls that are carried on coaxial sleeves, it is advantageous to mount the contact rolls for each winding roll for movement in a direction perpendicular to the rotation axis. This allows diameter differences in the various winding rolls to be compensated out. The axial length of each contact rollers should thus be equal to or greater than the width of the winding roll against which it is pressed.

It is known to support contact rollers of fixed length in individually movable holders and to press them with individually settable pressing force against the respective winding rolls. Contact rollers of fixed length can however only work with a relatively limited range of winding rolls. On change in winding width, the contact rollers must be switched with others of the appropriate length. In order to operate a winding machine with widely varying cut widths it is thus necessary to provide a large number of contact rollers. In addition on format change it is necessary to reposition the contact rollers and their supports.

German patent 3,941,384 describes a winding machine with this type of contact-roller system where cylindrically hollow roller segments are eccentrically mounted on a throughgoing support axle gaplessly next to each other as pressure rollers. The eccentric mounting is effective be able to move each roller segment against the winding roll perpendicular to its rotation axis relative to the adjacent winding rolls. In addition it is possible to lock together the roller segments in groups on the support axle. For very wide machines such a solution is not acceptable since the support axle inside the roller segments is of limited diameter so that the eccentricity necessary for the movement is sufficiently large. Under these circumstances in wide machines the common support axle for the eccentric segments is not stiff enough. In addition it is not possible to press any single roller segment with an individually controllable force against the winding roll.

SUMMARY OF THE INVENTION

It is an object of the invention to improve the known type of contact roller system so that it is sufficiently stiff that even with wide machines it can be used and so that the gap between two adjacent roller segments can be kept as small as possible to minimize marking.

According to the invention supports for the support axle can be arranged between two roller segments and/or an individual adjustment mechanism can be used, without making the spacing between two roller segments too great. The gap between two adjacent roller segments can be made very narrow in order to avoid annular marks on the winding rolls during winding.

BRIEF DESCRIPTION OF THE DRAWINGS

The drawing serves for describing the invention with reference to a simplified illustrated embodiment Therein.

EMBODIMENT OF THE INVENTION

The contact-roller system is part of a winding machine for winding up webs, in particular paper webs or plastic foils. The longitudinally cut web is wound on sleeves to rolls that are held during winding either by a common winding axle or each by two holding heads fitted into the sleeves. In particular at high winding speeds contact rollers are needed around which the web is partially looped and that each are pressed against a winding roll in order to prevent air from being introduced into the winding rolls.

The contact-roller system comprises a row of end-on-end adjacent hollow cylindrical roller segments 2 freely rotatably mounted on a stationary support axle. The axial length of each roller segment 2 is less than the minimum width of a web to be wound up, in this embodiment 200 mm to 300 mm. Adjacent roller segments can be coupled mechanically to each other in order to form a rigid contact roller with an axial length corresponding to the respective winding rolls. The common support axle 1 for all roller segments 2 extends over the entire working width of the winding machine. It is journaled at both ends in a frame of the machine.

Figure 1:
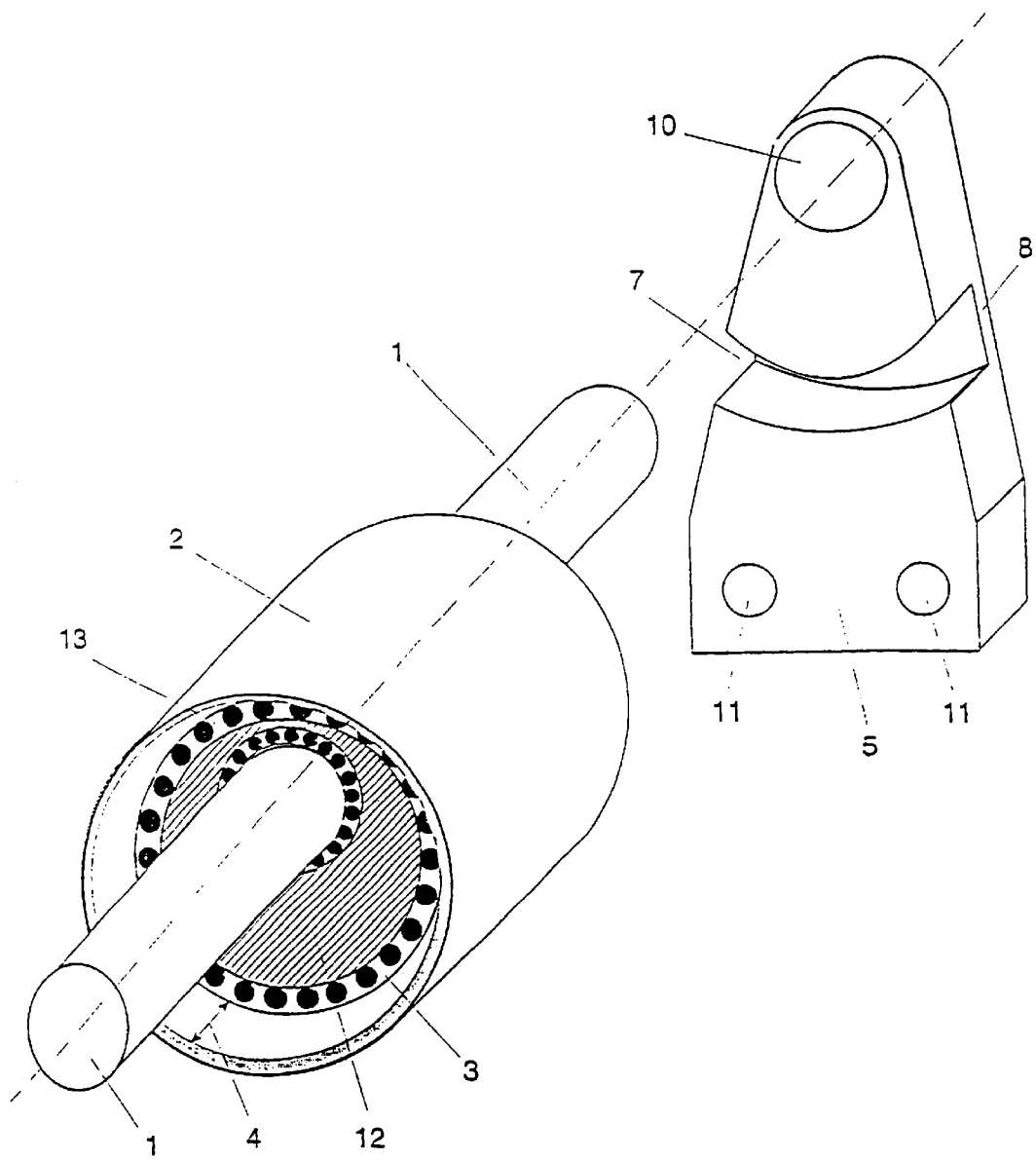
FIG. 1 is a perspective view of an eccentrically journaled roller segment with a support for the axle.
Figure 2:
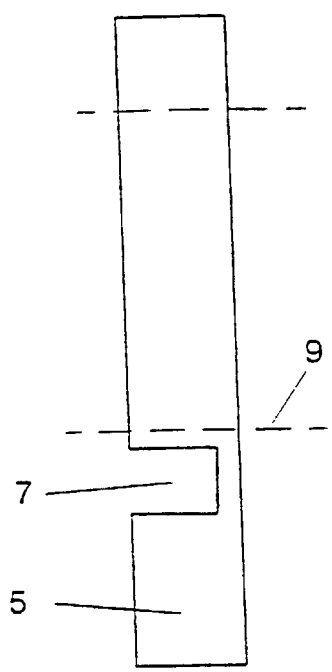
FIG. 2 is a cross-section through the support.

Each of the hollow cylindrical roller segments 2 is rotatably supported on the support axle 1 by radial bearings, preferably roller bearings, whose outer races are fixed on inner surfaces of respective roller segments 2. It is significant for the invention that the inner bearing parts of a roller segment 2 are separated at at least one axial end by a predetermined spacing 4 from the end face of the roller segment 2 as shown in FIG. 1. This makes it possible to provide in this free space parts of an additional support 5 for the axle 1 and/or an adjustment lever 6 that can extend outward to outside the cross-sectional region of the roller segment 2 where they are mounted. In the rotating region of the annular end face of a roller segment 2 the plate-shaped support 5 and the adjustment lever 6 each have a groove 7 in which the end of the roller segment 2 can rotate without contact. The minimal spacing between two adjacent roller segments 2 is thus determined by the thickness of the back wall 8 at the groove 7. In order to be able to maintain the spacing between two adjacent roller segments 2 as small as possible and avoid marking even very sensitive materials, for example plastic foils with a thickness of less than 10 $\mu$m, the thickness of the back wall 8 is less than 2 mm, preferably 0.7 mm–1.0 mm. The spacing between two adjacent roller segments is less than 5 mm, preferably between 0.8 mm and 3 mm.

Figure 3:
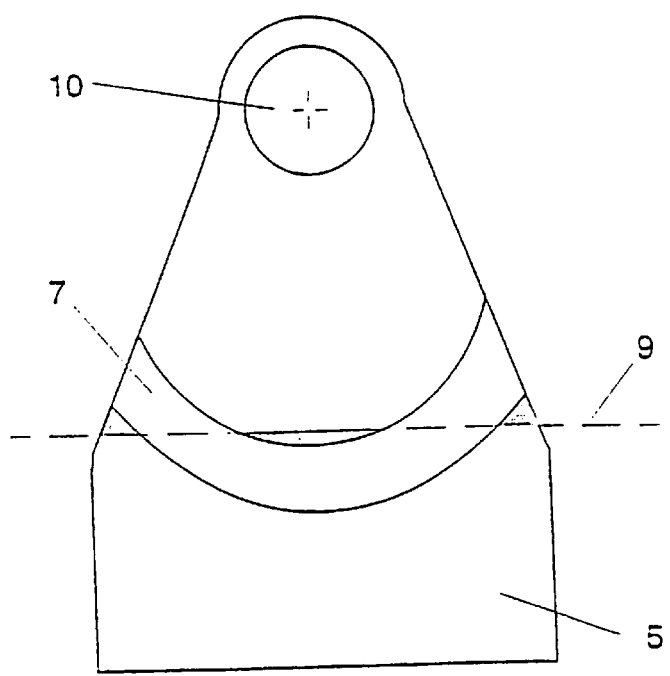
FIG. 3 is a top view of the support showing how the bend line runs.

In order that the support 5 is sufficiently stiff in spite of the very small back-wall thickness, it is necessary that the bend line 9 extending perpendicular to the main load direction not extend completely through the thin back wall 8. As shown in FIG. 3 the thick parts of the support 5 are such relative to the annular groove 7 that the bend line 9 also passes through thick portions outside the groove 7. Preferably the plate-shaped support 5 with the machined groove 7 is constructed such that the bend line 9 extends to both sides as well as in the central region with sufficient spacing from the groove 7 through the thick parts of the plate. Preferably the support 5 has on one end a throughgoing bore 10 by means of which it is fitted over the support axle 1 until its thick end with the throughgoing bore 10 enters into the roller segment 2. In this position the end of the roller segment 2 rotates in the groove 7. In order to be able to move the thick upper part of the support 5 sufficiently far into a roller segment 2, its thickness relative to the thickness of the groove back-wall is less than the spacing 4 of a radial bearing 3 from the end of the roller segment 2. At its lower end outside the roller segment 2 the support 5 has two throughgoing bores 11 through which bolts can be fitted in order to mount the support 5 on a support part of the winding machine, for example on a traverse.

In the embodiment shown in the Figures of a contact-roller system the roller segments 2 are each rotatably mounted eccentrically on the support axle 1. The eccentric mounting makes it possible to move each roller segment 2 perpendicular to its rotation axis, toward a winding roll, relative to the adjacent roller segments. Each roller segment 2 is thus able to individually accommodate the diameter of the respective winding roll. Such a contact-roll system is shown in German patent 3,941,384.

Figure 4:
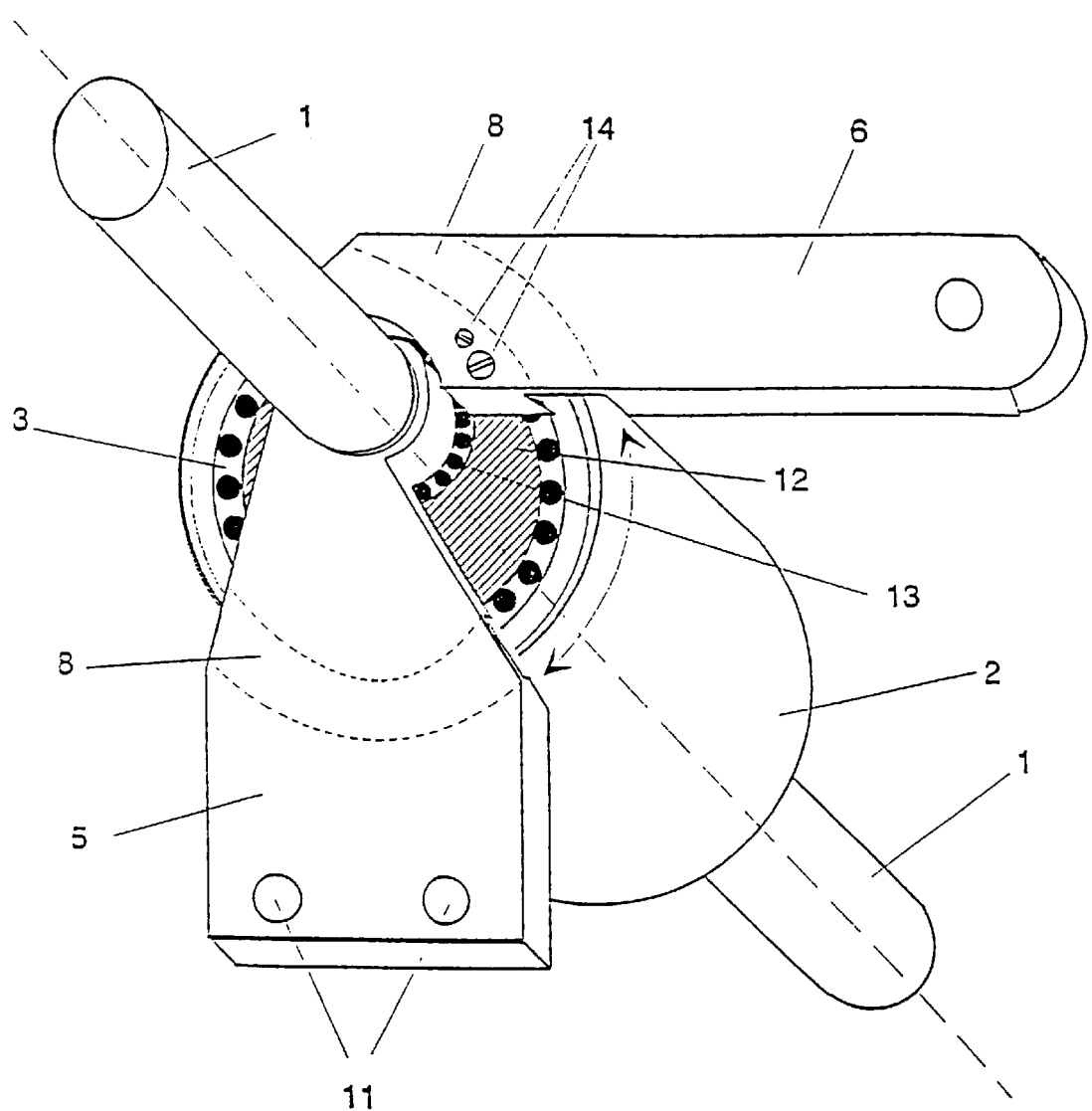
FIG. 4 is a perspective view of the arrangement of a support and a setting lever in the region between two roller segments.
Figure 5:
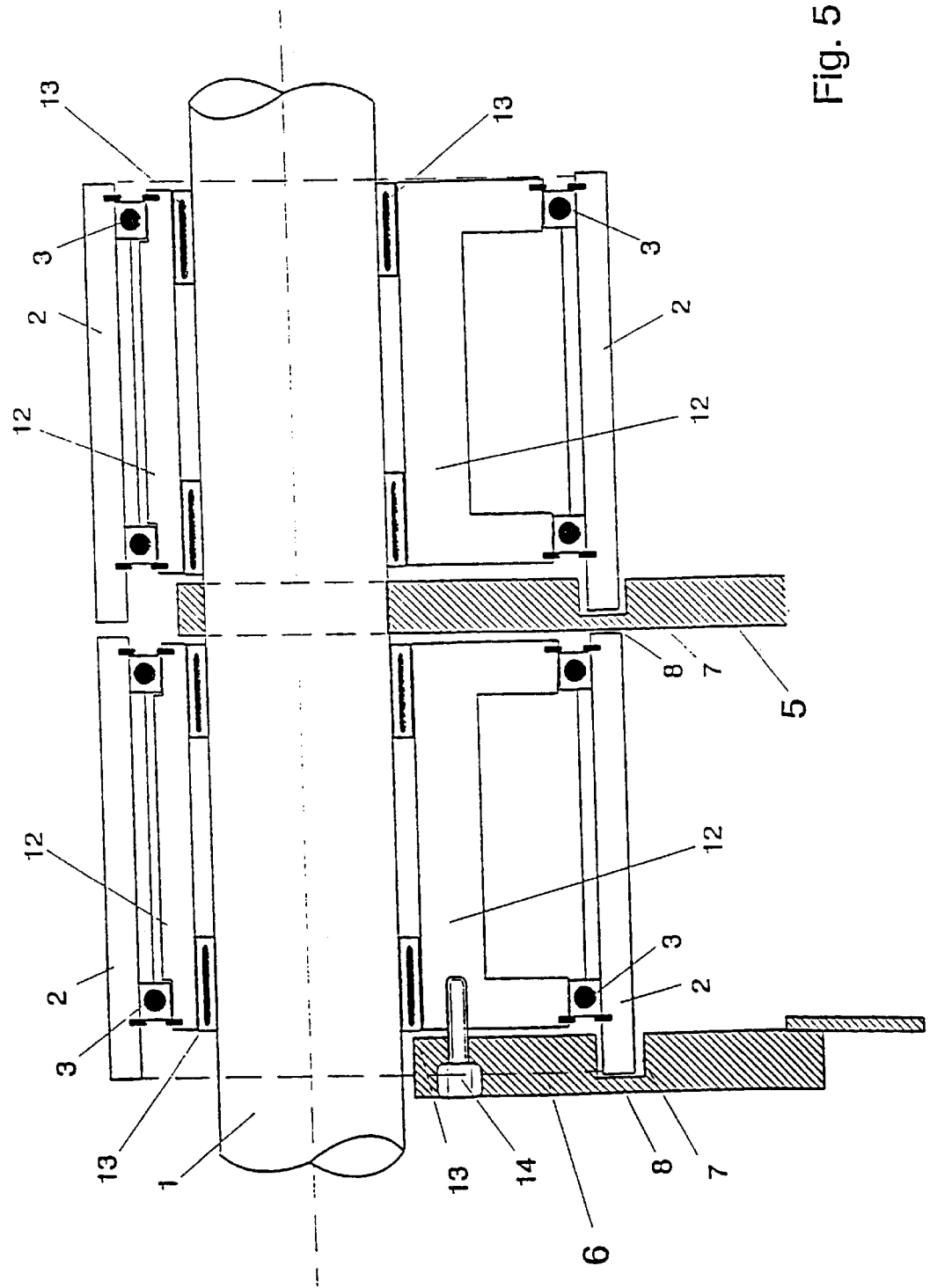
FIG. 5 is an axial section through the contact roller of FIG. 4.

As shown in FIGS. 1, 4, and 5, inside each roller segment 2 is an annular eccentric body 12 which is supported via needle bearings 13 eccentrically on the axle 1. At its axial ends each eccentric body 12 is widened out as an annular flange. Each annular flange is fitted over the outer race of a needle bearing 13 and inside the inner race of a radial bearing 3. In case a support 5 or adjustment lever 6 is to be mounted on one end of a roller segment 2, at this end the annular flange is set inward by the spacing 4.

The adjustment lever 6 serves to pivot the eccentric body 12 eccentrically about the support axle 1 in order to press a roller segment with a controlled force against a winding roll. Each adjustment lever 6 is to this end solidly bolted with its one end by means of screws 14 to the eccentric body 12. Its other end is connected with an actuating element, for example a pneumatic piston-cylinder unit that can pivot the eccentric body 12 about the axle 11 through the necessary angle. Like the support 5, the actuating lever 6 has on its end turned toward the roller segment 2 an annular groove 7 in which the end of the roller segment 2 can rotate without contact.

FIG. 4 shows an embodiment where between two adjacent roller segments 2 are mounted both a support 5 and an adjustment lever 6. In order to maintain the gap between the two roller segments 2 as small as possible, in this embodiment the support 5 and the adjustment lever 6 can both be mounted in a common plane perpendicular to the rotation axis. The back wall 8 of the groove 7 of the adjustment lever 6 moves in the plane of the back wall 8 of the groove of the support 5 so that the minimal spacing of the two roller segments 2 from each other is determined by the thickness of one of the back walls 8. The end of the adjustment lever 6 inside the roller segment 2 is constructed such that it engages around the support end of the support 5, so that on installation it can be slipped into place. The support 5 is so constructed that the adjustment lever 6 can be moved in the plane through the necessary angle without touching anything.

During winding, each winding roll is juxtaposed with roller segments 2 forming a contact roller of the necessary length, preferably by mechanically coupling together their adjustment levers 6. Each contact roller can be pressed with a controlled force by means on one of the adjustment levers 6 fixed to a roller segment 2 against the respective winding roll. Preferably the web of the winding roll is engaged so over the contact roller that it contacts the roller segments 2 over an angle between 5° and 30°, preferably between 8° and 20°.

What is claimed is:

1. In combination with a winding roll, a contact-roller system comprising:

an elongated support shaft extending along a rotation axis;

respective inner bodies spaced axially along the shaft and having axially opposite ends, the ends of axially adjacent bodies axially confronting each other and being axially separated from each other by a predetermined great axial spacing;

respective coaxial and tubular rollers rotatable on the bodies and having annular opposite ends defining gaps lying between the ends of the respective bodies, the ends of adjacent rollers axially confronting each other and being axially separated from each other by a predetermined small axial dimension substantially smaller than the great axial spacing between the respective bodies, whereby at each of the gaps the end of at least one of the respective rollers projects axially past the end of the respective body; and a plurality of elements each having
a radial outer part of an axial thickness greater than the small axial dimension and lying outside the rollers at a respective one of the gaps,
an inner part of an axial thickness also greater than the small axial dimension and lying inside the rollers between the respective bodies at the respective one gap, and
an arcuate web part between and unitary with the respective inner and outer parts, forming an arcuate axial groove in which one of the ends of the respective rollers engages axially, and of an axial dimension equal to slightly less than the small axial dimension.

2. The contact-roller system defined in claim 1 wherein the inner parts are connected to and support the shaft.

3. The contact-roller system defined in claim 1 wherein each of the bodies has eccentric inner and outer surfaces, each inner surface being rotatable on the shaft and each outer surface rotatably supporting the respective roller for rotation about an axis offset from an axis of the shaft, at least some of the inner parts being connected to the bodies, whereby pivoting of the elements connected to the bodies displaces the respective roller axes relative to the shaft axis.

4. The contact-roller system defined in claim 3 wherein at least some of the inner parts are connected to and support the shaft and are generally coplanar with the elements connected to the bodies.

5. The contact-roller system defined in claim 1 wherein the web axial dimension is less than 2 mm.

6. The contact-roller system defined in claim 5 wherein the web axial dimension is between 0.7 mm and 1.0 mm.

* * * * *